United States Patent
Jung et al.

(10) Patent No.: US 11,383,636 B2
(45) Date of Patent: Jul. 12, 2022

(54) AUTONOMOUS VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: Chan Hee Jung, Seoul (KR); Jin Su Jeong, Suwon-si (KR); In Wan Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/123,966

(22) Filed: Dec. 16, 2020

(65) Prior Publication Data

US 2021/0188160 A1    Jun. 24, 2021

Related U.S. Application Data

(60) Provisional application No. 62/950,091, filed on Dec. 18, 2019.

(30) Foreign Application Priority Data

Nov. 26, 2020   (KR) .................. 10-2020-0161743

(51) Int. Cl.
  *B60Q 1/46*    (2006.01)
  *B60Q 1/34*    (2006.01)
  *B60Q 1/52*    (2006.01)

(52) U.S. Cl.
  CPC .............. *B60Q 1/46* (2013.01); *B60Q 1/346* (2013.01); *B60Q 1/52* (2013.01)

(58) Field of Classification Search
  CPC ........... B60W 50/14; B60W 2540/229; B60W 60/00186; B60W 30/18163; G05D 1/0061;
  (Continued)

(56) References Cited

U.S. PATENT DOCUMENTS 6,023,221 A     2/2000  Micheletti
9,994,219 B2    6/2018  Nilsson et al.
(Continued)

FOREIGN PATENT DOCUMENTS

CN    206938591 U    1/2018
EP      3232286 A    10/2017
(Continued)

OTHER PUBLICATIONS

European Search Report dated Apr. 21, 2021, for the corresponding EP patent application No. EP20 21 3403 (11 pgs).

*Primary Examiner* — Eric Blount
(74) *Attorney, Agent, or Firm* — Lempia Summerfield Katz LLC

(57) ABSTRACT

An autonomous vehicle includes: an autonomous driving control device configured to request control of an emergency light or a turn signal light in consideration of a travel situation during autonomous driving; a user input device configured to sense a user input; and a body control device configured to flash the emergency light or the turn signal light in response to the request of the autonomous driving control device, and to control the emergency light or the turn signal light in response to the user input when the user input is sensed while flashing the emergency light or the turn signal light.

16 Claims, 9 Drawing Sheets

(58) Field of Classification Search
CPC ......... G05D 1/0088; G05D 2201/0213; B60Q 1/46; B60Q 1/346; B60Q 1/52
USPC ................................................ 340/463, 471
See application file for complete search history.

(56) References Cited

U.S. PATENT DOCUMENTS

| | | | |
|---|---|---|---|
| 10,525,983 B2* | 1/2020 | Ichikawa | ........ B60W 30/18163 |
| 2009/0003006 A1 | 1/2009 | Tsai | |
| 2012/0089300 A1 | 4/2012 | Wolterman | |
| 2017/0297569 A1 | 10/2017 | Nilsson et al. | |
| 2018/0111628 A1 | 4/2018 | Tamagaki et al. | |
| 2019/0317492 A1 | 10/2019 | Choi et al. | |

FOREIGN PATENT DOCUMENTS

| | | | |
|---|---|---|---|
| EP | 3552911 A | 10/2019 | |
| EP | 3838672 A1 * | 6/2021 | ............. B60Q 1/346 |

\* cited by examiner

AUTONOMOUS VEHICLE AND METHOD FOR CONTROLLING THEREOF

CROSS-REFERENCE TO RELATED APPLICATION

This application claims priority to and the benefit of U.S. Provisional Patent Application No. 62/950,091, filed on Dec. 18, 2019 and Korean Patent Application No. 10-2020-0161743, filed on Nov. 26, 2020, the entire contents of which are incorporated herein by reference.

FIELD

The present disclosure relates to an autonomous vehicle and a method for controlling thereof.

BACKGROUND

The statements in this section merely provide background information related to the present disclosure and may not constitute prior art.

An autonomous vehicle refers to a vehicle that determines a risk by recognizing a travel environment and plans a travel route by itself without manipulation of a driver, thereby traveling by itself. Levels of automation of such autonomous vehicle are classified into six levels from a level 0 to a level 5 based on a guideline (J3016) proposed by the Society of Automotive Engineers (SAE).

A vehicle of a SAE level equal to or higher than a level 3 may initiate minimum risk maneuver (MRM) and operate emergency light when an abnormal situation (e.g., failure occurrence, departure from a travelable region, and/or lane loss) occurs during autonomous driving. In this connection, when a lane change is performed as one method of the MRM control, even when turn signal light on one side is operated for the lane change, the operation of the turn signal light is not exposed to the outside because of the operation of the emergency light. Thus, a dangerous situation may occur during the lane change.

SUMMARY

The present disclosure provides an autonomous vehicle and a method for controlling thereof that control an emergency light and a turn signal light based on a travel situation when an emergency light control request or a turn signal light control request is made by a user while the emergency light or the turn signal light is flashed by an autonomous driving control device during autonomous driving.

According to one form of the present disclosure, an autonomous vehicle includes an autonomous driving control device that requests to control an emergency light or a turn signal light corresponding to a travel situation during autonomous driving, an user input device for receiving an user input, and a body control device that flashes the emergency light or the turn signal light in response to the request of the autonomous driving control device, and controls the emergency light or the turn signal light in response to the user input when the user input is received while flashing the emergency light or the turn signal light.

In one form, the body control device may determine whether a first turn signal light is in a necessary flashing state when the user input is received while the first turn signal light is flashed in response to the request of the autonomous driving control device.

In one form, the necessary flashing state may be a state where a flashing state must be maintained.

In one form, the body control device may suppress the user input while maintaining the flashing of the first turn signal light when the first turn signal light is in the necessary flashing state.

In one form, the body control device may turn off the first turn signal light and flash the emergency light or a second turn signal light in response to the user input when the first turn signal light is not in the necessary flashing state.

In one form, the body control device may determine whether the emergency light is in a necessary flashing state when the user input is received while the emergency light is flashing in response to the request of the autonomous driving control device.

In one form, the body control device may turn off the emergency light, and flash the emergency light or the turn signal light in response to the user input when the emergency light is not in the necessary flashing state.

In one form, the body control device may suppress the user input while maintaining the flashing of the emergency light when the emergency light is in the necessary flashing state.

According to one form of the present disclosure, a method for controlling an autonomous vehicle includes: receiving, by a body control device, an emergency light flash request or a turn signal light flash request from an autonomous driving control device; flashing, by the body control device, an emergency light or a turn signal light in response to the request of the autonomous driving control device; receiving, by the body control device, a user input while flashing the emergency light or the turn signal light; and suppressing, by the body control device, the user input based on an operation state of the emergency light or the turn signal light, or controlling the emergency light or the turn signal light based on the user input.

In one form, suppressing, by the body control device, may include determining whether a first turn signal light is in a necessary flashing state, and suppressing the user input while maintaining a flashing state of the first turn signal light when the first turn signal light is in the necessary flashing state.

In one form, suppressing, by the body control device, may further include turning off the first turn signal light and flashing the emergency light or a second turn signal light in response to the user input when the first turn signal light is not in the necessary flashing state.

In one form, suppressing, by the body control device, may include determining whether the emergency light is in a necessary flashing state, and suppressing the user input while maintaining the flashing of the emergency light when the emergency light is in the necessary flashing state.

In one form, suppressing, by the body control device, may further include turning off the emergency light when the emergency light is not in the necessary flashing state, and flashing the emergency light or the turn signal light in response to the user input.

In one form, suppressing, by the body control device, may include determining whether the emergency light or the turn signal light is in a necessary flashing state based on the emergency light flash request or the turn signal light flash request.

In one form, receiving, by a body control device, may include: calculating, by the autonomous driving control device, a desired level of an operation of the turn signal light and an operation of the emergency light based on a travel situation of the vehicle; requesting, by the autonomous driving control device, normal flashing of the emergency light or the turn signal light to the body control device when the calculated desired level is equal to or greater than a first reference value and less than a second reference value; and requesting, by the autonomous driving control device, desired flashing of the emergency light or the turn signal light to the body control device when the calculated desired level is equal to or greater than the second reference value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
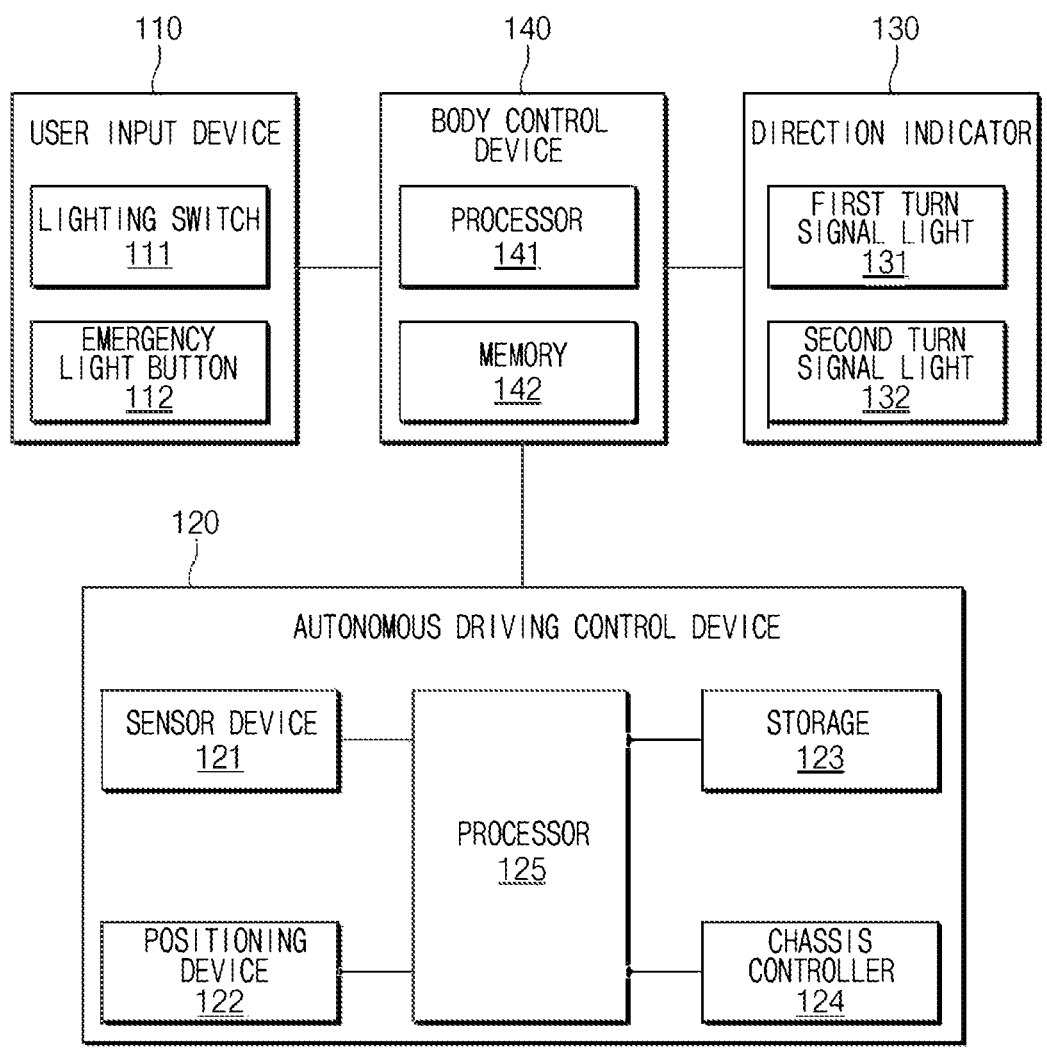
FIG. 1 is a block diagram illustrating an autonomous vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing various forms of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an autonomous vehicle according to one form of the present disclosure.

Referring to FIG. 1, an autonomous vehicle 100 may include a user input device 110, an autonomous driving control device 120, a direction indicator 130, and a body control device 140 connected with each other through a vehicle network. The vehicle network may be implemented as a controller area network (CAN), a media oriented systems transport (MOST) network, a local interconnect network (LIN), an Ethernet, and/or a X-by-Wire (Flexray).

The user input device 110 may generate data based on user manipulation. For example, the user input device 110 may generate a turn signal light control signal and/or an emergency light control signal in response to the user manipulation. Such user input device 110 may include a lighting switch 111 and an emergency light button 112. The lighting switch 111 may generate a left turn signal light flash signal (a left turn signal light operation signal), a right turn signal light flash signal (a right turn signal light operation signal), or a turn signal light turn off signal (a turn signal light operation stop signal) based on a location of the lighting switch. The emergency light button 112 may generate an emergency light flash signal (an emergency light operation signal) or an emergency light turn off signal (an emergency light operation stop signal) depending on a button state (e.g., a pressed state and the like) based on the user manipulation.

The autonomous driving control device 120 may acquire vehicle state information and travel environment information using at least one sensor mounted on the vehicle, and control longitudinal and/or lateral behaviors of the vehicle based on the acquired vehicle state information and travel environment information. The autonomous driving control device 120 may monitor a vehicle state (e.g., a vehicle speed, a steering angle, and/or an autonomous driving mode) and/or a travel environment to determine whether to operate an indicator (emergency light and turn signal light), an operation time point, and/or a flashing period. The autonomous driving control device 120 may include a sensor device 121, a positioning device 122, storage 123, a chassis controller 124, and a processor 125.

The sensor device 121 may detect (sense) exterior information (e.g., the travel environment) and interior information (e.g., the vehicle state) of the vehicle. The exterior information may include a travel speed of a surrounding vehicle, a distance between the vehicle and the surrounding vehicle, a weather, and/or a road condition, and the internal information may include the vehicle speed, the steering angle, and/or the autonomous driving mode. The sensor device 121 may include an illuminance sensor, a rain sensor, a radio detecting and ranging (RADAR), a light detection and ranging (LiDAR), a laser sensor, an image sensor, an ultrasonic sensor, a shock sensor, a speed sensor, a wheel speed sensor, a steering angle sensor, and/or an acceleration sensor.

The positioning device 122 may measure a current location of the vehicle 100. The positioning device 122 may be implemented as a global positioning system (GPS) receiver. The GPS receiver may calculate the current location of the vehicle using signals transmitted from three or more GPS satellites. The GPS receiver may calculate a distance between the satellite and the GPS receiver using a time difference between a time the satellite transmits the signal and a time the GPS receiver receives the signal. The GPS receiver may calculate the current location of the vehicle using the calculated distance between the satellite and the GPS receiver and location information of the satellite contained in the transmitted signal. In this connection, the GPS receiver may calculate the current location using triangulation.

The storage 123 may be a non-transitory storage medium that stores instructions executed by the processor 125. The storage 123 may store logic (algorithm) for performing a predetermined function, setting information, and map data. The storage 123 may be implemented as at least one of storage media (recording media) of a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), and/or a register. The storage 123 may store external environment recognition logic, user input recognition logic, travel state recognition logic, display control logic, lighting control logic, vehicle location recognition logic, collision determination prediction logic, and/or vehicle travel control logic, and the like. Each logic is a software module, which may be executed by the processor 125.

The chassis controller 124 controls steering, braking, suspension, and/or driving of the vehicle 100 in response to a command of the processor 125, which may include a driving device (a power transmission device), a steering device, a suspension device, a braking device, and the like. The driving device may generate power by controlling a power source (e.g., an engine or a motor) of the vehicle 100 and transmit the generated power to a wheel. The driving device may be implemented as an engine management system (EMS), a traction control system (TCS), and/or an all-wheel drive system (AWD). The steering device may change a travel direction of the vehicle 100 during travel. The steering device may be implemented as a four wheel steering system (4WS), an electric power steering (EPS), an active front steering (AES), and/or a steer by wire (SEW). The suspension device connects a vehicle body with an axle to alleviate a vibration and a shock generated on a road surface and maintain a posture of the vehicle. The suspension device may be composed of a spring that alleviates a shock transmitted from the road surface, a damper that suppresses a free vibration, and a stabilizer bar that suppresses a roll motion to improve travel stability of the vehicle. In addition, the suspension device may actively change a height of the vehicle body as well as a damping force of the damper and a stiffness of the stabilizer bar based on the travel environment. The braking device may decelerate or stop the vehicle 100. The braking device may monitor the vehicle state in real time during the travel and control the braking based on the vehicle state. The braking device may include an anti-lock braking system (ABS), an electronic stability control (ESC), and/or an electronic parking brake (EPB) system.

The processor 125 may control an overall operation of the autonomous driving control device 120. The processor 125 may be implemented as at least one of an application specific integrated circuit (ASIC), a digital signal processor (DSP), a programmable logic device (PLD), a field programmable gate arrays (FPGA), a central processing units (CPU), a microcontroller, and/or a microprocessor.

The processor 125 may sense (recognize) occurrence of an abnormal situation (an emergency light flashing situation or an emergency light operating situation) by monitoring the vehicle state and the travel environment using the sensor device 121 during autonomous driving. The processor 125 may acquire the vehicle state information and/or the travel environment information using the sensor device 121 to monitor a travel situation. The processor 125 may determine an operation mode (an operation state) and/or an operation time point of the emergency light and the turn signal light in consideration of the travel situation. In this connection, the operation modes may be classified into a necessary flash (necessary on, $ON_{necessary}$) mode, a normal flash (Normal ON, ON) mode, and a turn off mode. The necessary flash mode refers to a state in which the emergency light or the turn signal light must be flashed (blinked or flickered), and the normal flash mode refers to a state in which the emergency light or the turn signal light does not need to be flashed. That is, the necessary flash mode has higher priority than the normal flash mode. The processor 125 analyzes the travel situation of the vehicle (e.g., a vehicle behavior state and/or the travel environment) using predetermined algorithm and the like, so that the processor 125 is able to calculate a desired level (degree) of the turn signal light operation and/or the emergency light operation. The processor 125 may determine the normal flash mode when the desired level is equal to or greater than a first reference value and less than a second reference value. The processor 125 may determine the necessary flash mode when the desired level is equal to or greater than the second reference value. In this connection, the first reference value and the second reference value may be set by a system designer in advance.

When the operation mode of the emergency light and the turn signal light is determined, the processor 125 may transmit, based on the determined operation mode, an emergency light necessary flash signal, an emergency light normal flash signal (the emergency light flash signal), a turn signal light necessary flash signal, a turn signal light normal flash signal, the emergency light turn off signal, the turn signal light turn off signal, or the like to the body control device 140. For example, when a lane change is desired and there is no risk of collision with a rear-lateral vehicle, the processor 125 may transmit the turn signal light normal flash signal. When the lane change is desired but there is the risk of collision with the rear-lateral vehicle, the processor 125 may transmit the turn signal light necessary flash signal. When a rapid deceleration equal to or above a threshold is desired, but there is no risk of collision with a following vehicle, the processor 125 may transmit the emergency light normal flash signal. When an emergency stop is desired and there is the risk of collision with the following vehicle, the processor 125 may transmit the emergency light necessary flash signal.

The processor 125 may always recognize a vehicle behavior state in which lighting of the turn signal light is desired and a travel state in which the emergency light should not be turned off while being lighted during the autonomous driving. In other words, the processor 125 may monitor whether a travel situation in which the lighting of the turn signal light is desired and a travel situation in which the lighting of the emergency light is desired occurs during the autonomous driving. The processor 125 may output the turn signal light necessary flash signal when a situation in which flashing of the turn signal light is desired is sensed, and output the emergency light necessary flash signal when a travel situation in which the lighting of the emergency light is desired is sensed. For example, the processor 125 may generate the turn signal light necessary flash signal when the lane change is desired in a state in which MRM is initiated during the autonomous driving, and generate the emergency light necessary flash signal or the emergency light normal flash signal when stopping after deceleration. In addition, the processor 125 may generate the turn signal light normal flash signal when the lane change is desired during the autonomous driving, and generate the turn signal light turn off signal when the lane change is complete.

The direction indicator 130 is for indicating the travel direction of the vehicle, which may be mounted on each corner of an exterior of the vehicle. The direction indicator 130 may include a first turn signal light 131 and a second turn signal light 132 located at different sides. The first turn signal light 131 may include lamps respectively installed at a front corner and a rear corner of a first side (e.g., a left side) of the vehicle. The second turn signal light 132 may include lamps respectively installed at a front corner and a rear corner of a second side opposite to the first side. The direction indicator 130 may be used as the emergency light. When the direction indicator 130 is used as the emergency light, the first turn signal light 131 and the second turn signal light 132 may be flashed (operated) at the same time. When the direction indicator 130 is not used as the emergency light 131 and 132, the first turn signal light 131 or the second turn signal light 132 may be flashed (operated).

The body control device 140 may control various convenience devices, such as lamps, wipers, power windows, seats, central locking, and/or sunroofs, within the body of the vehicle. Such body control device 140 may include a processor 141 and a memory 142. The processor 141 controls an overall operation of the body control device 140, which may be implemented as at least one of the ASIC, the DSP, the PLD, the FPGA, the CPU, the microcontroller, and/or the microprocessor. The memory 142 may be a storage medium that stores instructions executed by the processor 141. The memory 142 may store logic (algorithm) and setting information for performing a predetermined function. The memory 142 may be implemented as at least one of storage media (recording media) such as the flash memory, the hard disk, the RAM, the SRAM, the ROM, the PROM, the EEPROM, the EPROM, and/or the register.

The processor 141 may flash at least one of the first turn signal light 131 and the second turn signal light 132 by regulating power supplied to the direction indicator 130 at a predetermined period. The processor 141 may control operations of the emergency light and the turn signal light based on an indicator control signal (an indicator manipulation request) transmitted from the user input device 110 and the autonomous driving control device 120. The processor 141 may operate the emergency light or the turn signal light in the necessary flash mode or the normal flash mode in response to the request of the autonomous driving control device 120 during the autonomous driving. In case of necessary flashing of the emergency light or the turn signal light, the processor 141 may suppress a user input from the user input device 110 and maintain the necessary flashing of the emergency light or the turn signal light. In addition, in case of normal flashing of the emergency light or the turn signal light, when there is the user input from the user input device 110, the processor 141 may temporarily stop the normal flashing of the emergency light or the turn signal light and control the operation of the emergency light or the turn signal light based on the user input.

When receiving an emergency light flash request from the autonomous driving control device 120 during the autonomous driving, the processor 141 may perform emergency light flashing by simultaneously operating the first turn signal light 131 and the second turn signal light 132. When there is a turn signal light flash request from the autonomous driving control device 120 during the emergency light flashing, the processor 141 may determine whether the turn signal light flash request is a necessary flashing request requesting the processor 141 to necessarily flashing the turn signal light. When it is determined that the turn signal light flash request is the necessary flashing request, the processor 141 may temporarily stop the emergency light flashing and flash the turn signal light. In this connection, the processor 141 may suppress an indicator control command input from the user input device 110. When there is a request to turn off the turn signal light from the autonomous driving control device 120 during the turn signal light flashing, the processor 141 may stop the turn signal light flashing operation and return to the emergency light flashing operation. In addition, when there is an emergency light necessary flashing request from the autonomous driving control device 120 during the emergency light normal flashing, the processor 141 may continue (maintain) the emergency light flashing. When the emergency light is flashed by the autonomous driving control device 120, the processor 141 may suppress the indicator control request (signal) input from the user input device 110.

When the indicator control request is input from the user input device 110 during the emergency light flashing by the autonomous driving control device 120, the processor 141 may determine whether a flashing state (the operation state) of the emergency light is a necessary flashing state. The processor 141 may determine whether the control signal previously received from the autonomous driving control device 120 is the necessary flashing request requesting the processor 141 to necessarily flashing the emergency light, thereby determining the flashing state of the emergency light. When the emergency light is in the necessary flashing state, the processor 141 maintains the emergency light flashing and may suppress (block) the indicator control request input from the user input device 110. In addition, when the emergency light is in a normal flash state, that is, not in the necessary flashing state, the processor 141 may turn off the emergency light 131 and 132, and control the operations of the emergency lights 131 and 132 or the turn signal light 131 or 132 in response to the indicator control request input from the user input device 110.

Figure 2:
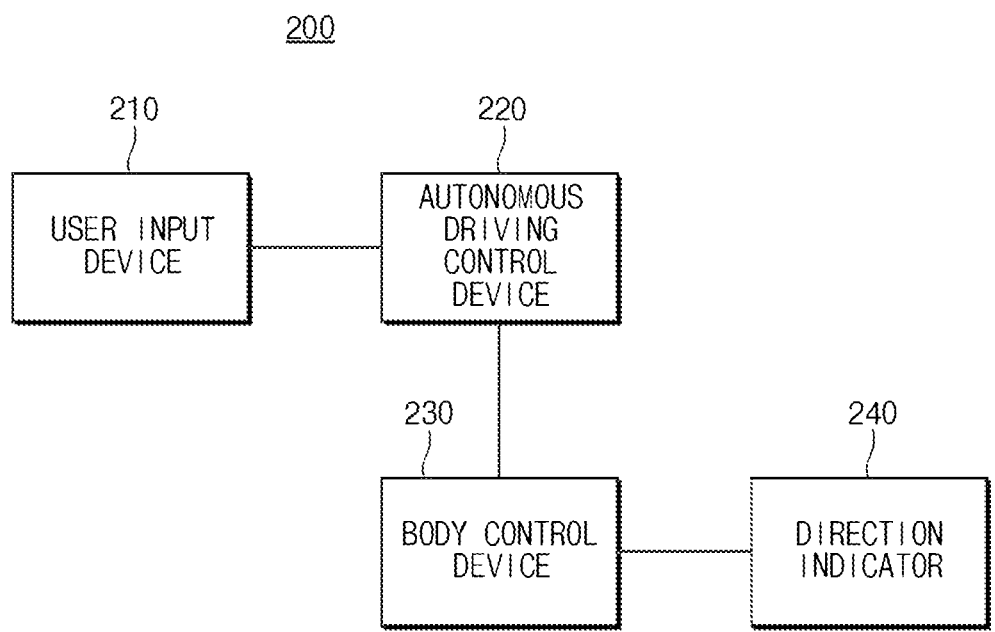
FIG. 2 is a block diagram illustrating an autonomous vehicle according to another embodiment of the present disclosure.

FIG. 2 is a block diagram illustrating an autonomous vehicle according to another form of the present disclosure.

Referring to FIG. 2, an autonomous vehicle 200 may include a user input device 210, an autonomous driving control device 220, a body control device 230, and a direction indicator 240 connected with each other through a vehicle network. The user input device 210, the autonomous driving control device 220, the body control device 230, and the direction indicator 240 respectively correspond to the user input device 110, the autonomous driving control device 120, the body control device 140, and the direction indicator 130 shown in FIG. 1, so that only differences therebetween will be described.

The user input device 210 may receive the user input. The user input device 210 may generate the indicator control signal based on the user input. In this connection, the indicator control signal may be the emergency light flash request, the turn signal light flash request, an emergency light turn off request, or a turn signal light turn off request.

The autonomous driving control device 220 may monitor the travel situation in real time using the sensors during the autonomous driving. The autonomous driving control device 220 may determine the operation mode of the emergency light or the turn signal light in consideration of the travel situation. When the operation mode is the necessary flash mode, the autonomous driving control device 220 may suppress the user input from the user input device 210. In addition, when the operation mode is the normal flash mode, the autonomous driving control device 220 may control the operation of the emergency light or the turn signal light in response to the user input from the user input device 210.

When the occurrence of the abnormal situation is sensed and the MRM is initiated, the autonomous driving control device 220 may request the emergency light flashing to the body control device 230. The body control device 230 may flash the emergency light by simultaneously operating the turn signal lights at the both sides of the direction indicator 240. When the lane change is desired in the emergency light flashing situation, the autonomous driving control device 220 may request the turn signal light flashing to the body control device 230. When the lane change is not desired in the emergency light flashing situation, the autonomous driving control device 220 may allow the emergency light flashing to be maintained.

When the emergency light turn off request or the turn signal light flash request is received from the user input device 210 during the emergency light flashing, the autonomous driving control device 220 may suppress the corresponding requests. In other words, the autonomous driving control device 220 may suppress the user input through the user input device 210 in a situation in which the emergency light is flashed based on the own determination. When there is the turn signal light flash request from the user input device 210 in the emergency light flashing situation, the autonomous driving control device 220 may determine whether to turn off the emergency light in consideration of the travel situation.

When it is determined to turn off the emergency light, the autonomous driving control device 220 may request to turn off the emergency light and transmit the turn signal light flash request to the body control device 230 in response to the user input through the user input device 210.

The body control device 230 may flash the turn signal light 131 or 132 on one side of the direction indicator 240 in response to the turn signal light flash request transmitted from the autonomous driving control device 220.

Figure 3:
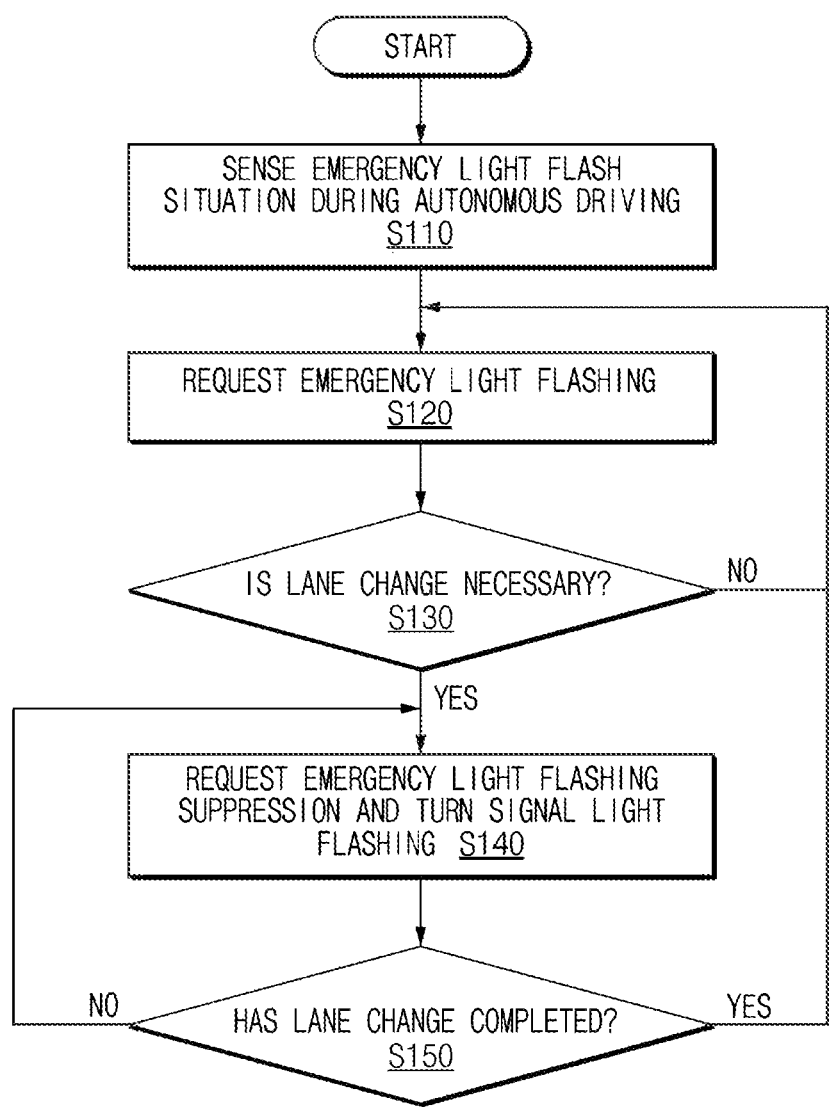
FIG. 3 is a flowchart illustrating a method for controlling an autonomous vehicle according to one form of the present disclosure.

FIG. 3 is a flowchart illustrating a method for controlling an autonomous vehicle according to one form of the present disclosure.

The autonomous driving control device 120 may sense the emergency light flashing situation (the abnormal situation) during the autonomous driving (S110). The autonomous driving control device 120 may monitor the travel situation in real time using the sensor device 121 during the autonomous driving. The autonomous driving control device 120 may sense the emergency light flashing situation, that is, the abnormal situation through the monitoring.

When sensing the emergency light flashing situation, the autonomous driving control device 120 may request the emergency light flashing to the body control device 140 (S120). When sensing the emergency light flashing situation, the autonomous driving control device 120 may request the emergency light necessary flashing or the emergency light normal flashing to the body control device 140. In this connection, the autonomous driving control device 120 may request to turn off the turn signal light together. The body control device 140 may perform the emergency light flashing by simultaneously operating the first turn signal light 131 and the second turn signal light 132.

The autonomous driving control device 120 may determine whether the lane change is necessary during the emergency light flashing (S130). For example, when the lane change is desired during MRM control, the autonomous driving control device 120 may determine that a current situation is a situation in which the lane change is desired.

When the lane change is desired, the autonomous driving control device 120 may request emergency light flashing suppression and the turn signal light flashing to the body control device 140 (S140). When the lane change is desired, the autonomous driving control device 120 may transmit the turn signal light necessary flash signal to the body control device 140. The body control device 140 may temporarily stop the emergency light flashing and flash the turn signal light 131 or 132 on one side. When the flashing of the turn signal light 131 or 132 on one side is identified, the autonomous driving control device 120 may perform the lane change.

The autonomous driving control device 120 may determine whether the lane change has completed during the turn signal light flashing (S150). When the lane change is complete, the autonomous driving control device 120 may return to S120 and request the body control device 140 to turn off the turn signal light on one side and flash the emergency light. When the lane change is not completed, the autonomous driving control device 120 may return to S140 and allow the flashing of the turn signal light 131 or 132 on one side to be maintained.

Figure 4:
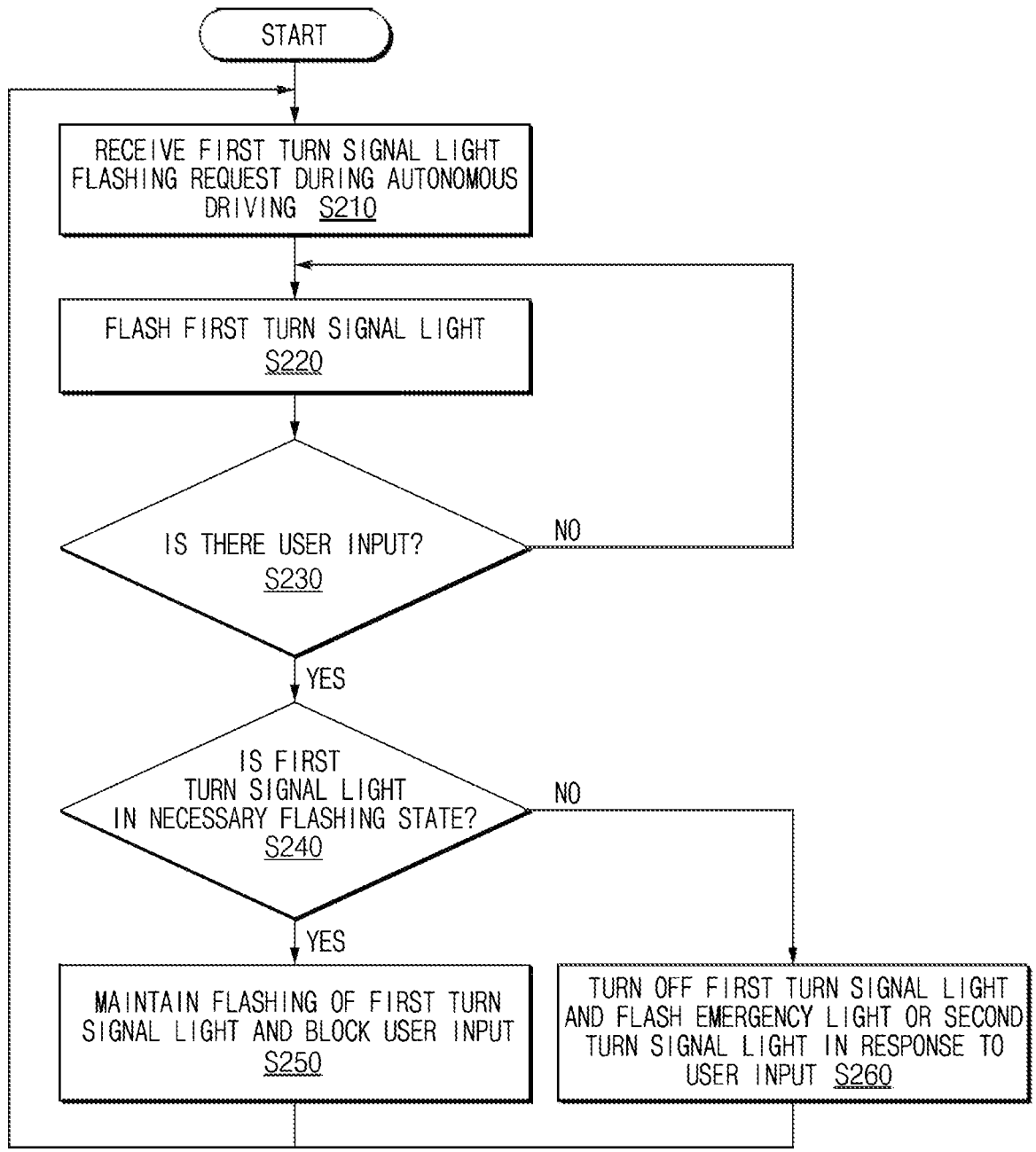
FIG. 4 is a flowchart illustrating a method for controlling an autonomous vehicle according to another form of the present disclosure.

FIG. 4 is a flowchart illustrating a method for controlling an autonomous vehicle according to another form of the present disclosure.

Referring to FIG. 4, the body control device 140 may receive a first turn signal light flash request from the autonomous driving control device 120 during the autonomous driving (S210). The autonomous driving control device 120 may sense the travel situation of the vehicle and determine the flashing of the first turn signal light (e.g., a left turn signal light or a right turn signal light). When the first turn signal light flashing is determined, the autonomous driving control device 120 may transmit a first turn signal light flash signal to the body control device 140. In this connection, the autonomous driving control device 120 may transmit a first turn signal light necessary flash signal 'ONnecessary' or a first turn signal light normal flash signal 'ON'.

The body control device 140 may flash the turn signal light in response to the request of the autonomous driving control device 120 (S220). The body control device 140 may flash the first turn signal light 131 based on the first turn signal light flash signal received from the autonomous driving control device 120.

The body control device 140 may determine whether there is the user input during the turn signal light flashing (S230). The body control device 140 may determine whether the emergency light flash signal or a second turn signal light flash signal is received from the user input device 110.

When there is the user input, the body control device 140 may determine whether an operation state of the first turn signal light 131 is the necessary flashing state (S240).

When the operation state of the first turn signal light 131 is the necessary flashing state, the body control device 140 maintains the flashing of the first turn signal light 131 and may suppress the user input from the user input device 110.

When the operation state of the first turn signal light 131 is not the necessary flashing state, the body control device 140 may turn off the first turn signal light 131 and flash the emergency lights 131 and 132 or the second turn signal light 132 in response to the user input. When the operation state of the first turn signal light 131 is the normal flash state, the body control device 140 may turn off the first turn signal light 131, and simultaneously flashing the emergency lights, that is, the first turn signal light 131 and the second turn signal light 132 or flashing the second turn signal light 132 in response to a control command input from the user input device 110.

Figure 5:
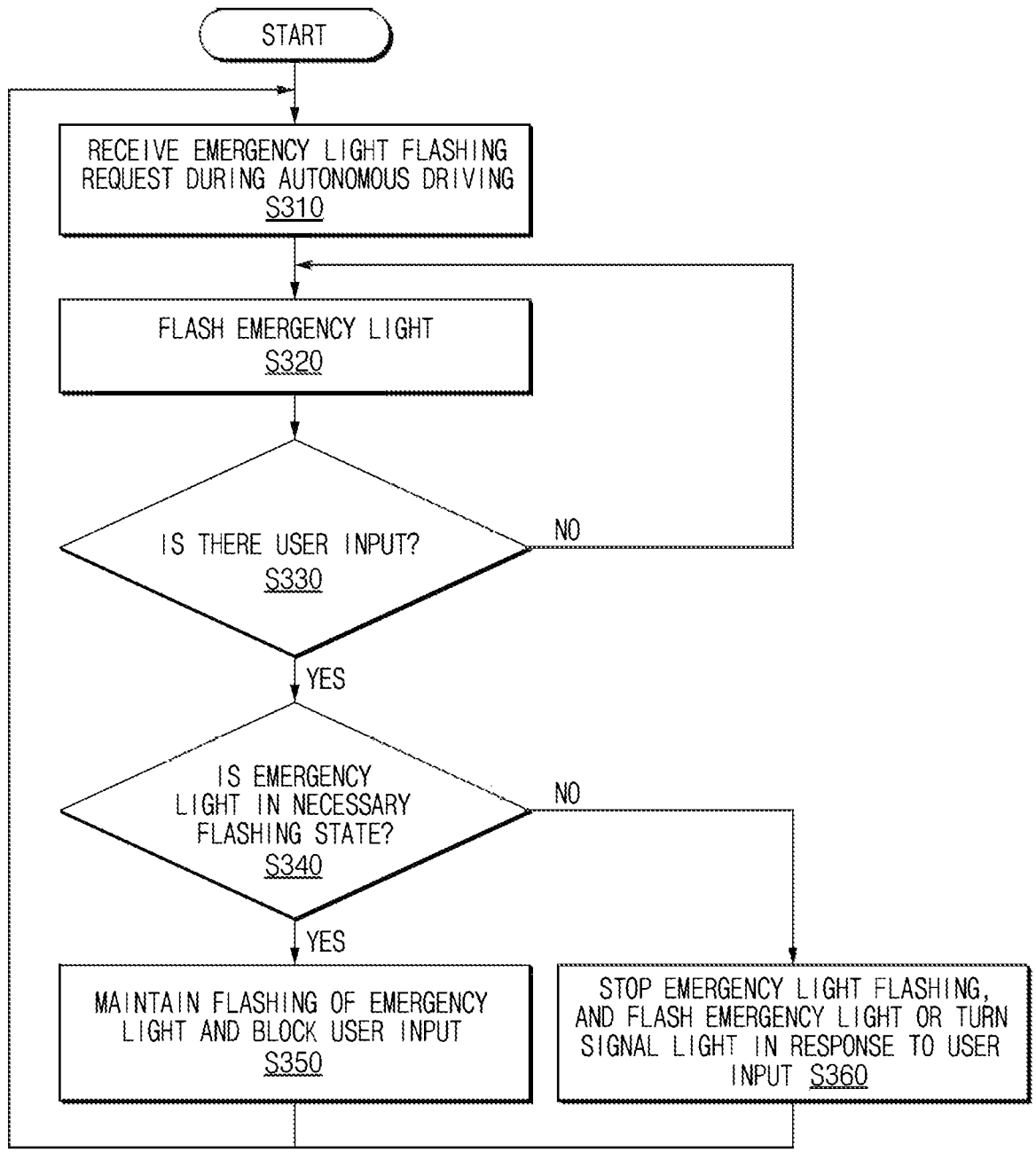
FIG. 5 is a flowchart illustrating a method for controlling an autonomous vehicle according to another form of the present disclosure.

FIG. 5 is a flowchart illustrating a method for controlling an autonomous vehicle according to another form of the present disclosure.

Referring to FIG. 5, the body control device 140 may receive the emergency light flash request from the autonomous driving control device 120 during the autonomous driving (S310). The autonomous driving control device 120 may sense the travel situation of the vehicle and determine the emergency light flashing (e.g., the emergency light necessary flashing or the emergency light normal flashing). When the emergency light flashing is determined, the autonomous driving control device 120 may transmit the emergency light flash signal to the body control device 140. In this connection, the autonomous driving control device 120 may transmit the emergency light necessary flash signal 'ONnecessary' or the emergency light normal flash signal 'ON'.

The body control device 140 may flash the emergency light in response to the request of the autonomous driving control device 120 (S320). The body control device 140 may flash the emergency lights, that is, the first turn signal light 131 and the second turn signal light 132 based on the emergency light flash signal received from the autonomous driving control device 120.

The body control device 140 may determine whether there is the user input during the emergency light flashing (S330). The body control device 140 may determine whether the turn signal light flash signal is received from the user input device 110.

When there is the user input, the body control device 140 may determine whether the operation state of the emergency light is the necessary flashing state (S340). The body control device 140 may determine whether the emergency light is the normal flash state or the necessary flashing state by identifying the control signal previously received from the autonomous driving control device 120.

When the emergency light is in the necessary flashing state, the body control device 140 may maintain the flashing of the emergency light and may suppress the user input from the user input device 110 (S350).

When the emergency light is not in the necessary flashing state, the body control device 140 may stop the emergency light flashing, and flash the emergency light or the direction indicator 130 in response to the user input (S360). When the emergency light is in the normal flash state, the body control device 140 may turn off the emergency light, and flash at least one of the first turn signal light 131 or the second turn signal light 132 in response to the control command input from the user input device 110.

Figure 6:
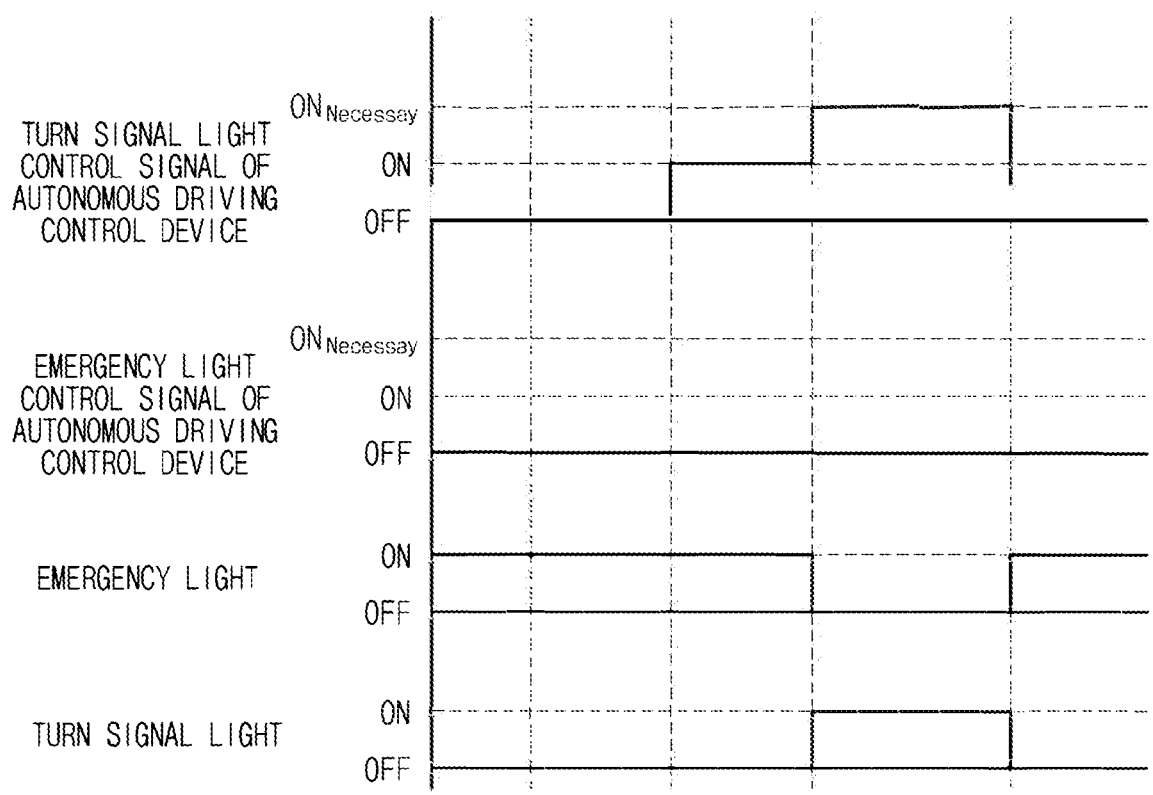
FIG. 6 is a diagram illustrating an example of controlling according to the present disclosure.

FIG. 6 is a diagram illustrating an example of controlling an autonomous vehicle according to the present disclosure.

Referring to FIG. 6, when receiving the emergency light flash signal from the emergency light button 112 of a driver, the body control device 140 may flash the emergency light. When receiving the turn signal light normal flash signal 'ON' from the autonomous driving control device 120 in the emergency light flashing situation, the body control device 140 may maintain the emergency light flashing. When receiving the turn signal light necessary flash signal 'ONnecessary' from the autonomous driving control device 120 in the emergency light flashing situation, the body control device 140 may stop the emergency light flashing and flash the turn signal light 131 or 132.

Figure 7:
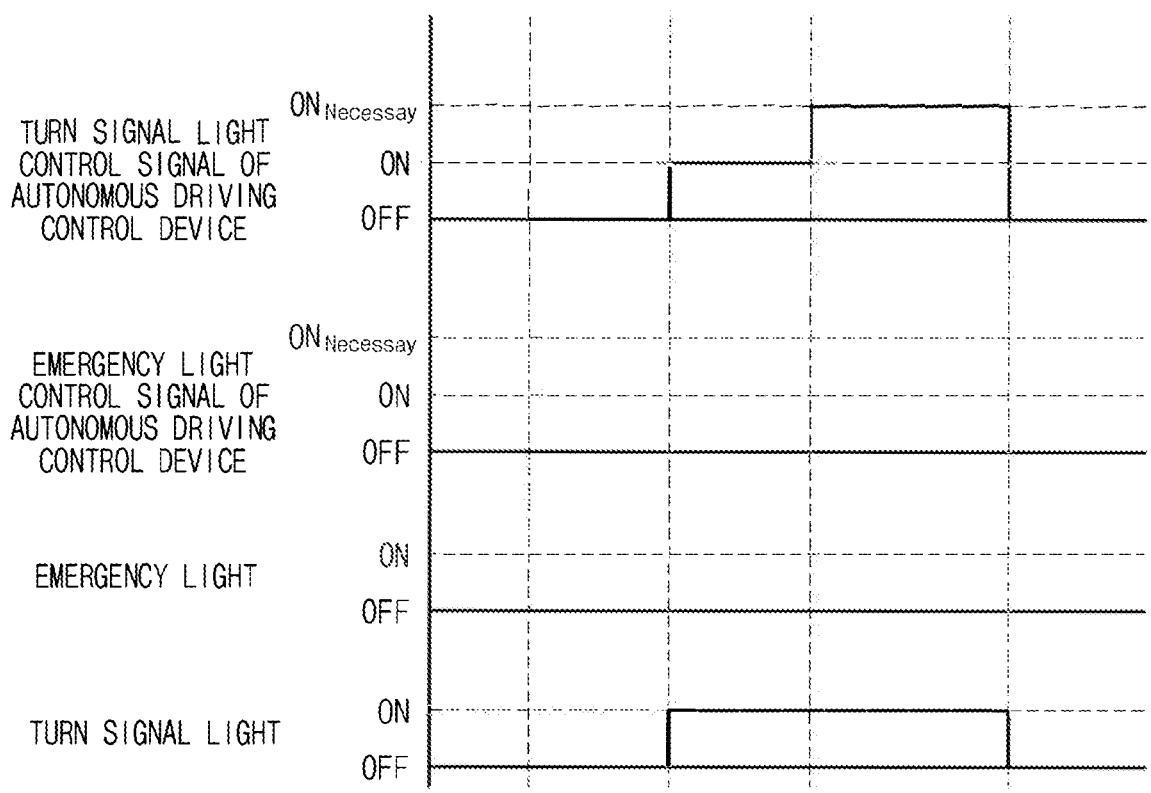
FIG. 7 is a diagram illustrating another example of controlling according to the present disclosure.

FIG. 7 is a diagram illustrating another example of controlling an autonomous vehicle according to the present disclosure.

When the lane change is desired during the autonomous driving, the autonomous driving control device 120 may request the turn signal light flashing to the body control device 140 based on the travel situation. When the lane change is desired for the travel based on a travel route, the autonomous driving control device 120 may request the turn signal light normal flashing. When the lane change is desired for the MRM control as the abnormal situation has occurred, the autonomous driving control device 120 may request the turn signal light necessary flashing. When the emergency light is turned off, the body control device 140 may flash the turn signal light 131 or 132 in response to the turn signal light normal flashing request or the turn signal light necessary flashing request of the autonomous driving control device 120.

Figure 8:
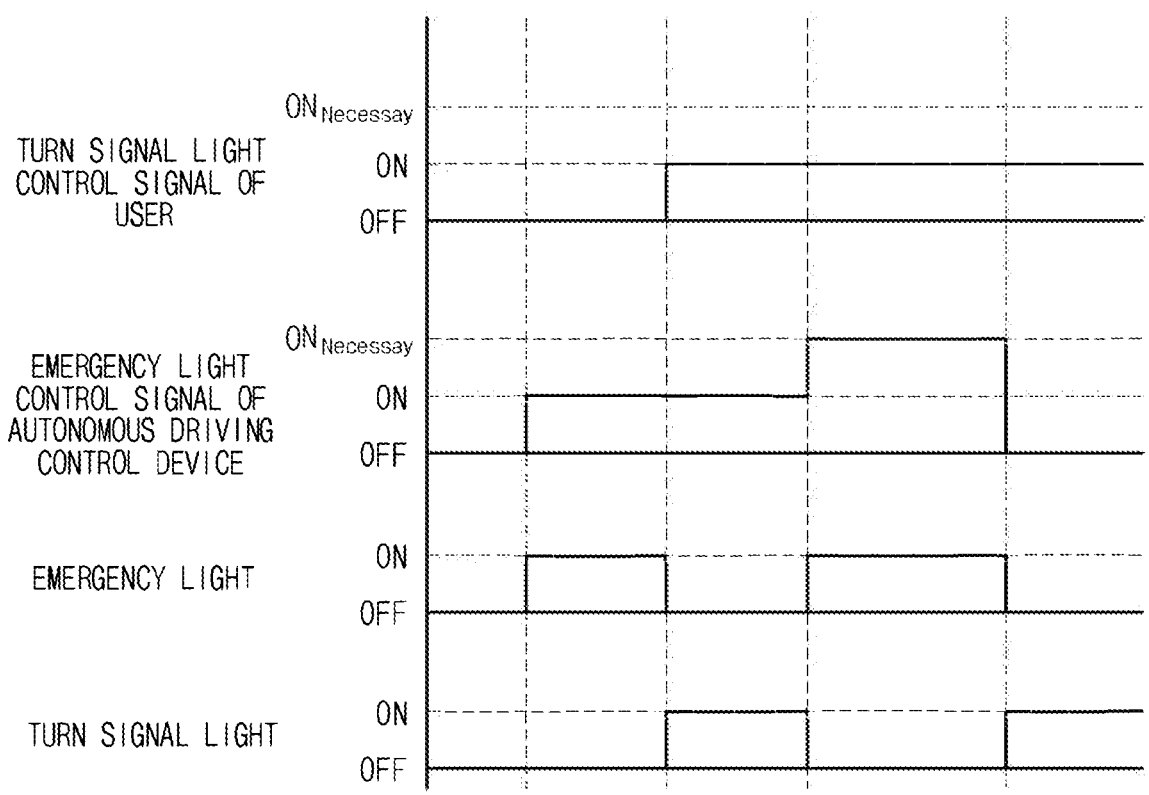
FIG. 8 is a diagram illustrating another example of controlling according to the present disclosure.

FIG. 8 is a diagram illustrating another example of controlling an autonomous vehicle according to the present disclosure.

When receiving the emergency light normal flashing request or the emergency light necessary flashing request from the autonomous driving control device 120, the body control device 140 may flash the emergency light. When there is the turn signal light flash request from the user while the emergency light is flashing by the request of the autonomous driving control device 120, the body control device 140 may determine whether the emergency light is in the necessary flashing state. When the emergency light is in the normal flash state other than the necessary flashing state, the body control device 140 may stop the emergency light flashing and flash the turn signal light 131 or 132. When the emergency light is in the necessary flashing state, the body control device 140 may suppress the turn signal light flash request of the user and maintain the emergency light flashing. When the emergency light is turned off by the request of the autonomous driving control device 120, the body control device 140 may flash the turn signal light 131 or 132 in response to the user input.

Figure 9:
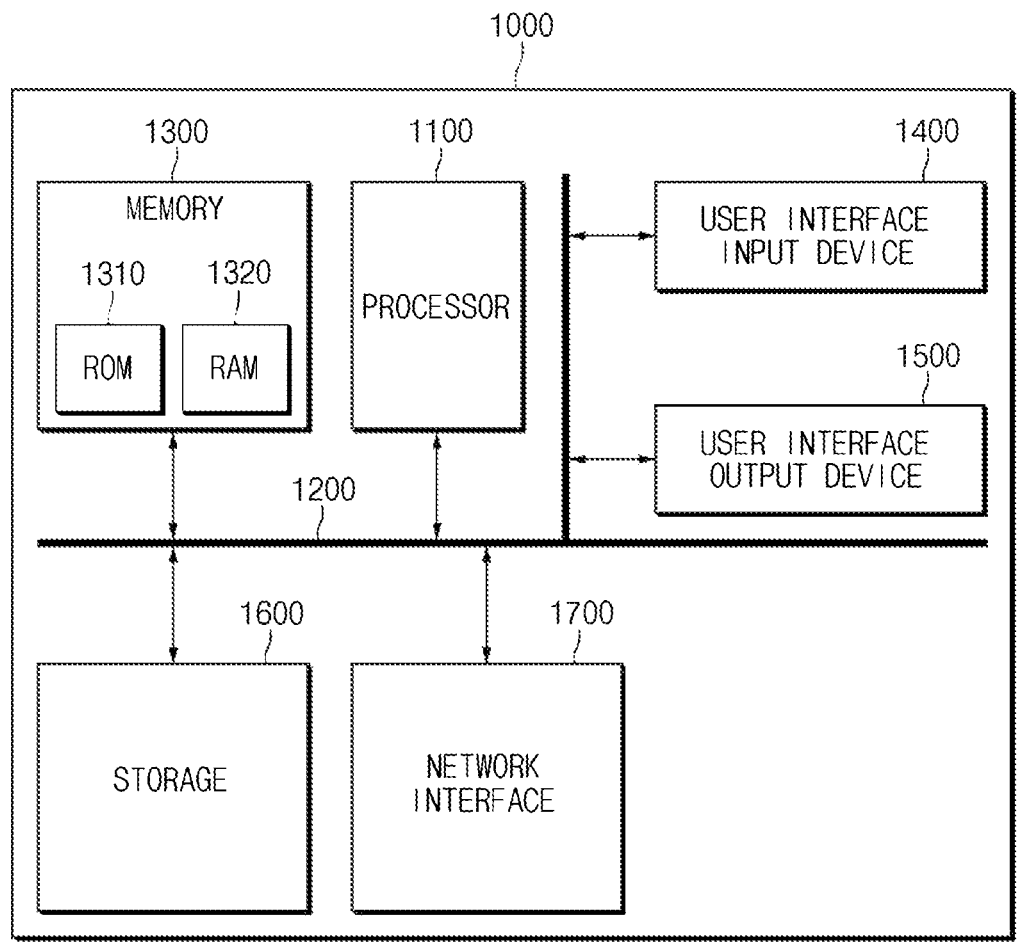
FIG. 9 is a block diagram illustrating a computing system executing a method for controlling an autonomous vehicle according to the present disclosure.

FIG. 9 is a block diagram illustrating a computing system executing a method for controlling an autonomous vehicle according to the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to the present disclosure, the emergency light and the turn signal light may be controlled based on the travel situation when the emergency light control request or the turn signal light control request is made by the user while the emergency light or the turn signal light is flashed by the autonomous driving control device during the autonomous driving. Therefore, when the lane change is in progress in the emergency light flashing state, information on a direction into which the vehicle will change the lane may be provided to the surrounding vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle comprising:
an autonomous driving control device configured to:
calculate a desired level of an operation of a turn signal light and an operation of an emergency light based on a travel situation during autonomous driving; and
request normal flashing or necessary flashing of the emergency light or the turn signal light to a body control device based on the calculated desired level;
a user input device configured to receive a user input; and
the body control device configured to:
flash the emergency light or the turn signal light in response to the request of the autonomous driving control device; and
control the emergency light or the turn signal light to based on the user input and a flashing state of the emergency light or the turn signal light when the user input is received while flashing the emergency light or the turn signal light.

2. The autonomous vehicle of claim 1, wherein the body control device is configured to determine whether a first turn signal light is in a necessary flashing state when the user input is received while the first turn signal light is flashed in response to the request of the autonomous driving control device.

3. The autonomous vehicle of claim 2, wherein the necessary flashing state is a state where a flashing state must be maintained.

4. The autonomous vehicle of claim 2, wherein the body control device is configured to suppress the user input while maintaining the flashing of the first turn signal light when the first turn signal light is in the necessary flashing state.

5. The autonomous vehicle of claim 2, wherein the body control device is configured to turn off the first turn signal light, and flash the emergency light or a second turn signal light in response to the user input when the first turn signal light is not in the necessary flashing state.

6. The autonomous vehicle of claim 1, wherein the body control device is configured to determine whether the emergency light is in a necessary flashing state when the user input is received while the emergency light is flashing in response to the request of the autonomous driving control device.

7. The autonomous vehicle of claim 6, wherein the body control device is configured to turn off the emergency light, and flash the emergency light or the turn signal light in response to the user input when the emergency light is not in the necessary flashing state.

8. The autonomous vehicle of claim 6, wherein the body control device is configured to suppress the user input while maintaining the flashing of the emergency light when the emergency light is in the necessary flashing state.

9. A method for controlling an autonomous vehicle, the method comprising:
calculating, by an autonomous driving control device, a desired level of an operation of a turn signal light and an operation of an emergency light based on a travel situation of the autonomous vehicle;
requesting, by the autonomous driving control device, normal flashing or necessary flashing of the emergency light or the turn signal light to a body control device based on the calculated desired level;
receiving, by the body control device, the request from the autonomous driving control device;
flashing, by the body control device, the emergency light or the turn signal light in response to the request of the autonomous driving control device;
receiving, by the body control device, a user input while flashing the emergency light or the turn signal light; and
controlling, by the body control device, the emergency light or the turn signal light based on the user input and a flashing state of the emergency light or the turn signal light.

10. The method of claim 9, wherein controlling, by the body control device, includes:
determining whether a first turn signal light is in a necessary flashing state; and
suppressing the user input while maintaining a flashing state of the first turn signal light when the first turn signal light is in the necessary flashing state.

11. The method of claim 10, wherein controlling, by the body control device, further includes:

turning off the first turn signal light and flashing the emergency light or a second turn signal light in response to the user input when the first turn signal light is not in the necessary flashing state.

12. The method of claim 10, wherein the necessary flashing state is a state where the flashing state must be maintained.

13. The method of claim 9, wherein controlling, by the body control device, includes:
   determining whether the emergency light is in a necessary flashing state; and
   suppressing the user input while maintaining the flashing of the emergency light when the emergency light is in the necessary flashing state.

14. The method of claim 13, wherein controlling, by the body control device, further includes: turning off the emergency light when the emergency light is not in the necessary flashing state; and
   flashing the emergency light or the turn signal light in response to the user input.

15. The method of claim 9, wherein controlling, by the body control device, includes:
   determining whether the emergency light or the turn signal light is in a necessary flashing state based on the emergency light flash request or the turn signal light flash request.

16. The method of claim 9, wherein requesting, by a body control device, includes:
   requesting, by the autonomous driving control device, normal flashing of the emergency light or the turn signal light to the body control device when the calculated desired level is equal to or greater than a first reference value and less than a second reference value; and
   requesting, by the autonomous driving control device, necessary flashing of the emergency light or the turn signal light to the body control device when the calculated desired level is equal to or greater than the second reference value.

* * * * *

UNITED STATES PATENT AND TRADEMARK OFFICE
CERTIFICATE OF CORRECTION

| | |
|---|---|
| PATENT NO. | : 11,383,636 B2 |
| APPLICATION NO. | : 17/123966 |
| DATED | : July 12, 2022 |
| INVENTOR(S) | : Chan Hee Jung, Jin Su Jeong and In Wan Kang |

It is certified that error appears in the above-identified patent and that said Letters Patent is hereby corrected as shown below:

In the Claims

Column 13, Claim 1, Line 66: delete "to" after "light".

Signed and Sealed this
Eleventh Day of October, 2022

Katherine Kelly Vidal
*Director of the United States Patent and Trademark Office*